United States Patent [19]

Lepere

[11] 3,770,473

[45] Nov. 6, 1973

[54] ENAMEL TO BE APPLIED ON NATURAL OR ARTIFICIAL TEETH

[76] Inventor: Louis Jules Lepere, rue Vanderschrick 65, Brussels, Belgium

[22] Filed: Mar. 25, 1970

[21] Appl. No.: 23,520

[30] Foreign Application Priority Data
Mar. 26, 1969 Belgium .................................. 71886

[52] U.S. Cl. .................... 106/220, 106/35, 106/237, 117/167, 117/168
[51] Int. Cl. ...................... C08h 11/02, C08h 11/06
[58] Field of Search ....................... 106/35, 220, 237

[56] References Cited
UNITED STATES PATENTS
3,003,998 10/1961 Germann et al. ..................... 106/35
3,471,927 10/1969 Eisenberg ............................. 106/35
3,509,089 4/1970 Dougherty ........................... 106/35

FOREIGN PATENTS OR APPLICATIONS
984,872 2/1951 France ................................. 106/35

*Primary Examiner*—Allan Lieberman
*Attorney*—Waters, Roditi, Schwartz & Nissen

[57] ABSTRACT

The enamel to be applied on natural or artificial teeth is obtained by dispersing a nontoxic pigment in an ethanolic solution containing one or several nontoxic film-forming emulsifying and plastifying substances.

2 Claims, No Drawings

ENAMEL TO BE APPLIED ON NATURAL OR ARTIFICIAL TEETH

The present invention relates to an enamel to be applied by means of a brush on natural or artificial teeth. This enamel presently regarded as a cosmetic opens new possibilities for adorning and these are now perfectly admissible provided the enamel appears white or ivory. The enamel may become acceptable in the future if it is given a bright color which can be fluorescent or not.

The enamel intended for covering teeth must fulfil several requirements which are partially contradictory. It must not contain substances liable to be toxic or aggressive in any way nor any substance having therapeutic properties. These requirements limit considerably the choice of constituents. Thus the enamel should have adequate covering power and should also be usable for covering teeth or parts of teeth made of gold or other metals. The enamel must be easy to use and it must dry quickly. Its resistance to abrasion should be such that the enamel will not be affected by hot or cold foodstuffs and beverages or by alcoholic drinks; nevertheless the enamel should be easy to remove by brushing with water and ordinary toothpaste or possibly by rubbing with a pad of cotton wool soaked in alcohol only. The enamel should be so simple to eliminate that no one would dream of using solvents like those used for nail varnish.

The enamel to be applied on teeth according to the present invention meets all these requirements. It comprises an emulsion of a nontoxic pigment in an ethanolic solution containing one or several nontoxic film-forming dispersing and plastifying substances.

The enamel may advantageously contain, in 55 to 75 parts by weight of ethanol, 4 to 9 parts by weight of titanium oxide, 10 to 30 parts by weight of a natural resin, 3 to 6 parts by weight of castor oil, 3 to 7 parts by weight of an acid phthalic ester of an aliphatic alcohol having 2 to 4 carbon atoms and from 0.8 to 0.4 part by weight of amyl acetate; the amount of amyl acetate required can be reduced by increasing the number of carbon atoms of the alcohol esterified with phthalic acid.

The following example represents an embodiment of the invention.

To a dispersion containing 30 parts by weight of titanium white and 4.8 parts by weight of castor oil prepared in a mixing machine is added firstly a solution of 17 parts by weight of shellac, 3.6 parts by weight of diethyl phthalate and 0.6 part by weight of ethyl acetate in 36 parts by weight of ethanol and secondly 2 parts by weight of an ethanolic solution of a fragrant essence such as oil of spearmint and the dispersion is then completed.

The crude color of titanium oxide can be made off-white by mixing with shellac and if the latter is suitably chosen enamel of any desired shade of ivory can be produced.

I claim:

1. An enamel to be applied on natural or artificial teeth comprising a dispersion comprising 55 to 75 parts by weight of ethanol containing 4 to 9 parts by weight of titanium oxide, 10 to 30 parts by weight of a shellac, 3 to 6 parts by weight of castor oil, 3 to 7 parts by weight of an acid phthalic ester of an aliphatic alcohol having 2 to 4 carbon atoms and from 0.8 to 0.4 part by weight of amyl acetate.

2. An enamel according to claim 1 comprising
66 parts by weight of ethanol
7 parts by weight of titanium oxide
17 parts by weight of shellac
4.8 parts by weight of castor oil
3.7 parts by weight of diethyl phthalate
0.5 part by weight of amyl acetate
2 parts by weight of a solution of a fragrant essence.

* * * * *